July 3, 1973  D. R. GEORGE ET AL  3,743,695
URANIUM RECOVERY
Filed Sept. 17, 1970
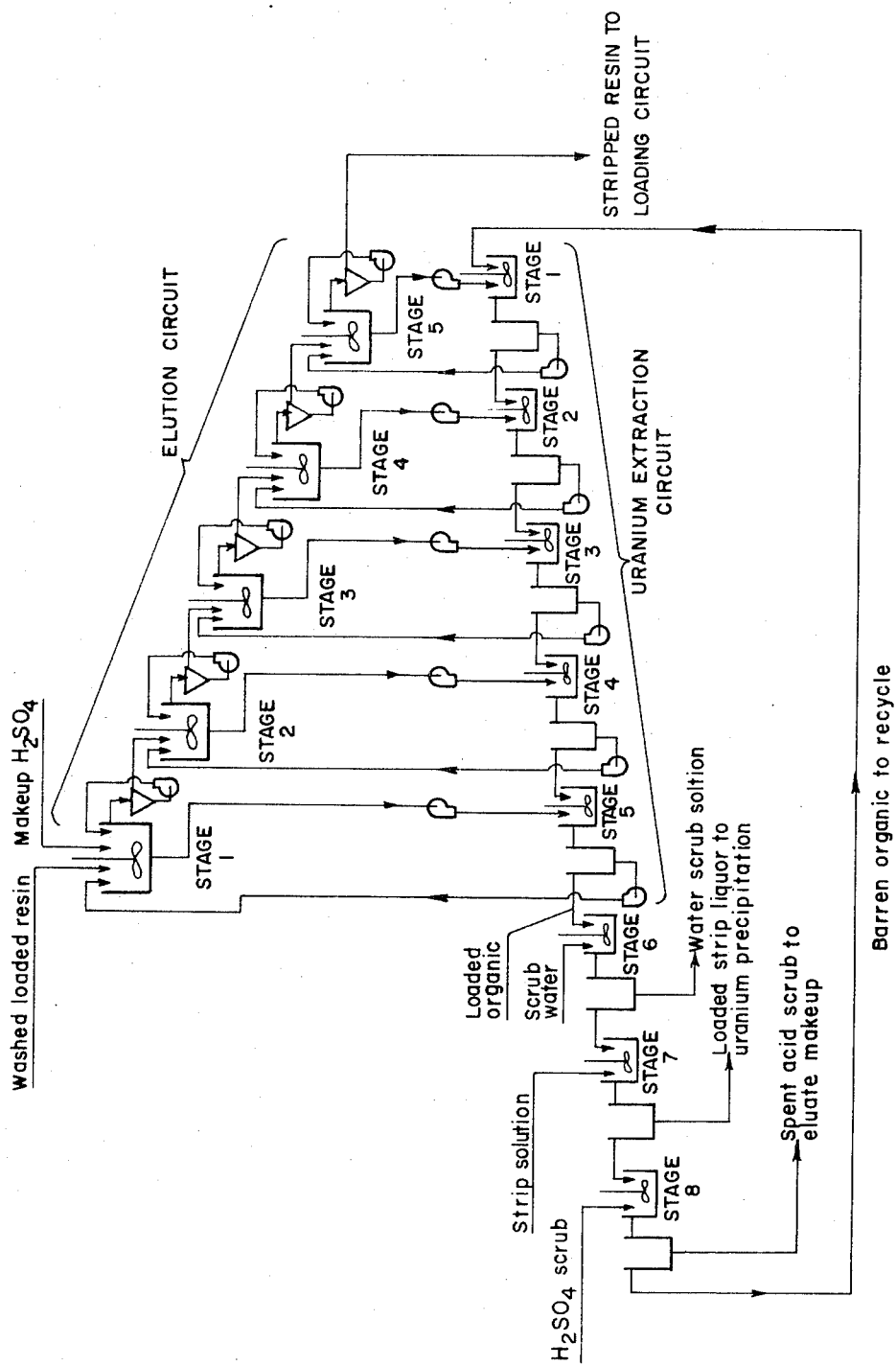
INVENTORS
D'ARCY R. GEORGE
JOHN R. ROSS
BY Ernest S. Cohen
   William S. Brown
ATTORNEYS

United States Patent Office 3,743,695
Patented July 3, 1973

3,743,695
URANIUM RECOVERY
D'Arcy R. George and John R. Ross, Salt Lake City, Utah, assignors to the United States of America as represented by the Secretary of the Interior
Filed Sept. 17, 1970, Ser. No. 72,929
Int. Cl. C01g 56/00
U.S. Cl. 423—8                                        5 Claims

ABSTRACT OF THE DISCLOSURE

The invention relates to an improved method for recovery of uranium by elution from an ion exchange resin using sulfuric acid as the eluting agent. The elution is conducted in a series of stages, each elution stage being coupled with a solvent extraction stage, thereby achieving a substantially improved rate of uranium elution.

---

Winning of uranium from ores is conventionally accomplished by leaching the ore with sulfuric acid, followed by sorption of the uranium on strong base ion exchange resins. In the sorption reaction the uranium is removed from the uranium-bearing solution as a negatively charged sulfate complex in accordance with reaction (1) where $R^+$ designates the active ion exchange sites on the resin and $X^-$ a bound anion.

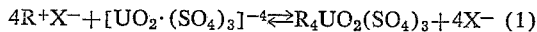

The uranium is then recovered from the ion exchange resin by elution, commonly with sulfuric acid, followed by solvent extraction of the uranium from the eluate with an organic extractant. Acidic chloride or nitrate solutions are also used as eluants; however, for reasons of economy, final product purity and problems connected with potential pollution of water supplies, elution with sulfuric acid has been increasingly adopted. Elution of uranium with sulfuric acid occurs primarily by displacement of the uranium sulfate complex by bisulfate ($HSO_4^-$) as depicted in Reaction 2.

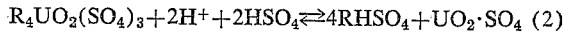

Because bisulfate is a relatively weak displacing ion, elution with sulfuric acid can be effectively achieved only by employing the mass action effect. Thus, large volumes of solution muts be used to reduce the concentration of uranium relative to the concentration of bisulfate or, alternatively, a large number of stages must be used to provide a decreasing concentration of uranium in each stage. In addition, heating of the solutions may be employed to increase dissociation of $H_2SO_4$ to $HSO_4^-$.

In one type of prior art uranium ore processing operation employing sulfuric acid solutions to elute or strip uranium from loaded ion exchange resins, the resins are contacted countercurrently in a series of agitated tanks with a 10 to 12 percent sulfuic acid solution. Uranium is then recovered from the uranium-bearing eluate by solvent extraction and chemical precipitation techniques. The barren eluate, after addition of sulfuric acid, then is recycled to the elution circuit, or it may be used for leaching. This method of eluting and recovering uranium is referred to in the uranium milling industry as the Eluex Process.

Commonly, when using 12 to 14 stages of countercurrent elution, the volume of solution required is about 6 gallons per gallon of resin, and the resin retention time is 240 to 360 minutes. In other installations, only six stages of elution are used but under these condition it is necessary to increase the solution volume to at least 12 gallons per gallon of resin and the resin retention time to 600 to 700 minutes.

The large solution volumes, long resin retention times, and the large number of stages required by the Eluex process increases the plant investment and operating costs for recovering uranium. Therefore, there is an obvious need to improve elution efficiency.

It has now been found, in accordance with the present invention, that the elution efficiency in the Eluex, or similar processes, may be substantially improved by coupling a stage of solvent extraction with each stage of elution and recycling the sulfuric acid raffinate from the solvent extraction stage to the corresponding elution stage, rather than by conducting the elution and solvent extraction operations in series. This results in a substantial decrease in the resin retention time, and in the number of elution stages required.

The uranium bearing feed for loading the ion exchange resin is conventionally obtained by leaching a uranium ore with sulfuric acid. The resulting slurry may be filtered and the filtered solution employed to load the resin. Alternatively, the resin-in-pulp technique may be employed to load the resin. This technique involves direct application of ion-exchange to the pulp, i.e., to the mixture of leach liquor and spent ore, without filtration.

The ion exchange resin employed in the process of the invention may be any of a variety of conventional strong base-type ion exchange resins. These are usually characterized by the presence of quaternary ammonium groups fixed to a polystyrene-divinylbenzene matrix and are conventionally prepared by chloromethylation of the copolymer bead using chloromethyl methyl ether and a Friedel-Crafts catalyst, followed by reaction of the product with a tertiary amine, usually trimethylamine or dimethylethanolamine, in the presence of a polar solvent such as water to form a quaternary ammonium salt.

The resin is usually employed in a mesh size of about −16 to +40. Optimum mesh size, as well as type of resin, will, however, depend on the nature of the uranium feed slurry or solution, rate of elution desired, desirea purity of product, etc., and is usually best determined experimentally. The amount of $U_3O_8$ on the loaded resin will usually range from about 2 to 5 pounds per cubic foot.

The optimum number of stages employed for elution and solvent extraction will also vary according to a number of factors, such as condition of the resin, rate of solution recycle, purity of product, temperature, $H_2SO_4$ concentration, etc. However, usually about 3 to 5 stages are satisfactory, with four stages of elution and solvent extraction giving good results when amine type extractants are employed.

Concentration of the sulfuric acid eluant may vary from about 8 to 12 percent, with about 10 percent acid generally giving good results. Recycle rates of sulfuric acid eluant will vary from about 10 to 20 gallons per minute per gallon of resin flow.

The organic extractant is also conventional and preferably comprises a long chain tertiary alkyl amine, such as tricaprylyl amine, in a diluent such as kerosine or naphtha. Other suitable extractants are the dialkyl phosphates. The extractant is preferably employed as an approximately 2.5 to 5 percent solution in the diluent. Optimum organic-to-aqueous flow ratios are determined by various factors such as the $U_3O_8$ loading of the resin, the resin feed rate and the concentration of the organic solution. In general, however, when using amine extractants the organic flow rates should be such as to provide organic loadings of about 3 to 6 grams of $U_3O_8$ per liter.

Following extraction, the organic extractant is stripped to remove the uranium. The preferred stripping agent is a 10 percent sodium carbonate solution at an organic-to-aqueous ratio of about 5 or 6 to 1. Other suitable stripping agents include ammonium sulfate and ammonia at a pH of about 4 to 4.2.

The stripped organic solvent is then preferably scrubbed with a 10 percent solution of sulfuric acid at an organic-to-aqueous ratio of about 12 to 15 to 1. The resulting barren organic solvent is then recycled to stage 1 of the solvent extraction circuit.

The invention will now be more specifically illustrated by means of the following example which describes a specific embodiment of the process of the invention. This description will be facilitated by reference to the figure which is a flow diagram of the specific embodiment.

EXAMPLE

In this example, the coupled resin elution and uranium solvent extraction circuit comprised five stages in the elution circuit and eight stages in the solvent extraction circuit, as shown in the figure. Each of the elution stages consisted of a mechanically agitated, open top tank of about 7 liters capacity and a circular vibrating screen fitted with a 35-mesh screen cloth. Immersion heaters (not shown in figure) were used to control temperatures in the elution tanks at 42° C. The tanks and screens were mounted at successively lower elevations so as to allow gravity flow from stage 1 through stage 5. The eight stages in the solvent extraction circuit comprised 5 stages of uranium extraction, 1 stage of water scrubbing, 1 stage of uranium stripping, and 1 stage of sulfuric acid scrubbing. Each stage consisted of a mechanically agitated mixer and an interconnected settler assembled from 4 liter glass beakers and arranged for gravity flow of the organic phase from stage 1 through stage 8. A series of pumps and flowmeters (not shown in figure) allowed for feeding or recycling of a precise amount of solution in each stage of the elution and solvent extraction circuits.

The circuit was operated in the following manner. Each of the elution tanks was filled to an appropriate level with 10 percent sulfuric acid solution. Resin, loaded to 57 grams of $U_3O_8$ per liter, then was fed continuously, at the rate of 50 milliliters per minute to the elution tank of stage 1 (tank 1) where the suspension of resin and solution was vigorously agitated. The suspension then continuously overflowed through a side outlet to the vibrating screen where the resin was separated. Solution draining through the screen was returned by pump to tank 1, and the resin flowed by gravity to elution tank 2. The same procedure was repeated in stage 2 and in each of the succeeding elution stages until the resin, substantially free of uranium, was discharged from the circuit by the screen following elution tank 5. To compensate for the entrained solution removed from the elution circuit with the resin, and also to compensate for the uptake of $H_2SO_4$ by the resin as a result of displacement of uranium, about 0.5 milliliter of 25 percent $H_2SO_4$ per milliliter of resin was fed continuously to the first elution stage to maintain the required solution and acid balance.

Simultaneously, with the advance of resin through the elution circuit, the solution in each of the five elution tanks was continuously recycled at a rate of 500 milliliters per minute between each of the uranium extraction stages in the solvent extraction circuit, but in reverse order. Thus, the solution in elution stage 5 was recycled to extraction stage 1 and from elution stage 1 to extraction stage 5, etc. This was accomplished by drawing solution with a pump through a screened outlet in each of the elution tanks and introducing it into the appropriate mixer where the uranium was extracted into the organic phase. The mixed phases then flowed to the connected settler where the phases separated and the aqueous phase, now depleted in uranium, was returned by pump to the elution tank.

Stripped organic at the rate of 500 milliliters per minute was fed continuously to the first extraction stage and flowed by gravity in succession from stage 1 through stage 5 of the solvent extraction circuit. The loaded organic, containing 5.6 grams of $U_3O_8$ per liter, then entered extraction stage 6 where small amounts of entrained sulfuric acid solution was removed by contacting the organic with a continuous flow of water at the rate of 50 milliliters per minute. After separation of the phases in the settler, the aqueous phase was discarded and the organic was next stripped of uranium in stage 7 with 100 milliliters per minute of a 10 percent solution of sodium carbonate. The aqueous phase separated in this operation was a purified solution containing 28 grams of $U_3O_8$ per liter. Uranium was recovered from the solution by acidifying to pH 3 with $H_2SO_4$, heating to expel $CO_2$, and then neutralizing to pH 7 with $NH_3$. Finally, the stripped organic was contacted in stage 8 with 50 milliliters per minute of 10 percent $H_2SO_4$ to neutralize any entrained sodium carbonate solution and to convert the amine in the organic extractant from the free base to the bisulfate form. The regenerated organic then was recycled to the first solvent extraction stage.

The organic extractant used in this example was a kerosene solution, containing by volume, 5 percent tricaprylyl amine and 2 percent isodecanol. The capacity of this solution to extract uranium from a 10 percent sulfuric acid solution is 5 to 6 grams of $U_3O_8$ per liter. Resin used in this example was a minus-16 plus-20-mesh quaternary ammonium resin, of the type previously described, and containing 57 grams of $U_3O_8$ per liter. At equilibrium, the quantity of resin in each elution tank averaged 1,250 milliliters. Thus, as the resin flow in this example was 50 milliliters per minute, the resin retention time was 25 minutes per stage.

Under the above described condition in this example, the resin was eluted to a residual $U_3O_8$ loading of 0.68 gram per liter in four elution stages and to 0.14 gram per liter in five stages. These correspond to resin-retention times of only 100 to 125 minutes and clearly demonstate the rapid elution of uranium from ion exchange resin possible by this method of operation.

What is claimed is:

1. In a process for recovery of uranuim comprising elution of the uranium from an ion exchange resin using multiple elution stages and sulfuric acid as eluting agent, and extraction of the uranium from the eluate by means of an organic extractant, the improvement comprising coupling each elution stage with a solvent extraction stage and recycling the uranium-depleted eluate from each solvent extraction stage to the corresponding elution stage.

2. The process of claim 1 in which the number of elution stages is from 3 to 6.

3. The process of claim 2 in which the number of elution stages is 5.

4. The process of claim 1 in which the eluate recycle rate is about 5 to 25 times the flowrate of the resin between successive elution stages.

5. The process of claim 4 in which the eluate recycle rate is about 10 times the resin flowrate.

References Cited

UNITED STATES PATENTS

| | | | |
|---|---|---|---|
| 2,914,378 | 11/1959 | Kennedy | 423—7 |
| 3,030,175 | 4/1962 | Magner et al. | 423—10 |
| 3,523,765 | 8/1970 | Grieneisen | 423—10 |

CARL D. QUARFORTH, Primary Examiner

R. L. TATE, Assistant Examiner

U.S. Cl. X.R.

423—7